Figure 1:
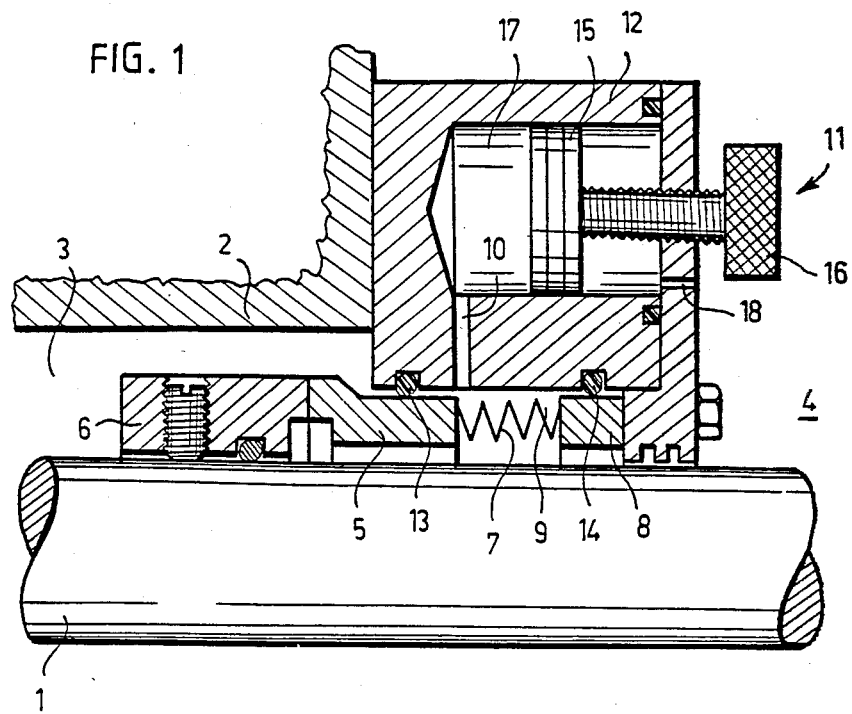

United States Patent [19]

Heilala

[11] Patent Number: 4,688,806
[45] Date of Patent: Aug. 25, 1987

[54] SLIDE RING SEALING ASSEMBLY WITH BELLOWS AND FLUID PRESSURE CONTROL OF SEALING PRESSURE

[75] Inventor: Antti-Jussi Heilala, Järvenpää, Finland

[73] Assignee: Oy Safematic Ltd., Muurame, Finland

[21] Appl. No.: 849,376

[22] Filed: Apr. 8, 1986

[30] Foreign Application Priority Data

Apr. 12, 1985 [FI] Finland ................................. 851482

[51] Int. Cl.$^4$ ............................................. F16J 15/36
[52] U.S. Cl. ......................................... 277/88; 277/27
[58] Field of Search ................. 277/3, 27, 81 R, 81 P, 277/88–90

[56] References Cited

U.S. PATENT DOCUMENTS

| | | | |
|---|---|---|---|
| 1,673,260 | 6/1928 | Meston et al. | 277/88 |
| 1,891,706 | 12/1932 | DeRam | 277/89 |
| 2,048,581 | 7/1936 | Weiher | 277/88 |
| 2,271,303 | 1/1942 | Moulet | 277/89 |
| 3,318,604 | 5/1967 | Tracy | 277/88 |
| 3,526,408 | 9/1970 | Tracy | 277/88 |
| 4,114,904 | 9/1978 | Wentworth | 277/88 |

FOREIGN PATENT DOCUMENTS

| | | | |
|---|---|---|---|
| 572278 | 10/1945 | United Kingdom | 277/89 |
| 812046 | 4/1959 | United Kingdom | 277/89 |

Primary Examiner—Robert S. Ward, Jr.
Attorney, Agent, or Firm—Cushman, Darby & Cushman

[57] ABSTRACT

A slide ring seal for sealing the gap between a rotatable shaft (1) and a fixed wall (2) to separate a space (3) for a pressure fluid from the external space (4). The slide ring seal comprises at least one seal ring (5) mounted on a fixed wall or a shaft and at least one face ring (6) secured to said shaft or fixed wall. The seal ring and face ring are provided with sealing slide surfaces that are axially pressed against one another. Moreover, the seal ring is mounted on said fixed wall or shaft through a bellows member (7). To achieve a slide ring seal being reliable in operation and having controlled sealing properties, the bellows member (7) is isolated from the space (3) for the pressure fluid by means of a sealed space (9). Said sealed space (9) is further connected to a regulable pressure source (11) by means of a conduit (10).

5 Claims, 2 Drawing Figures

U.S. Patent

Aug. 25, 1987

4,688,806

SLIDE RING SEALING ASSEMBLY WITH BELLOWS AND FLUID PRESSURE CONTROL OF SEALING PRESSURE

The present invention relates to a slide ring seal for sealing the gap between a rotatable shaft and a fixed wall to separate a space for a pressure fluid from the external space, said slide ring seal comprising at least one seal ring mounted on a fixed wall or a shaft and at least one face ring secured to said shaft or fixed wall, said seal ring and face ring being provided with sealing slide surfaces that are axially pressed against one another and said seal ring being mounted on said fixed wall or shaft through a bellows member.

With a slide ring seal, the product—i.e. the pressure fluid—is compressed between two flat rings rotatable relative to one another in such a manner that the pressure of said product will drop in the narrow gap between the slide surfaces either to atmospheric pressure or, if two pairs of slide rings are used, to the pressure of the sealing liquid between said pairs of slide rings.

Such slide ring seals are used in pumps, refiners, mixers, fans and equivalent devices wherein a rotatable shaft extends through a fixed wall. Different pressures as well as different liquids and gases may be provided on different sides of the wall. Thus the pressure fluid may be a liquid or gas, and the external space may be a pressurized or non-pressurized liquid or gas space or the atmosphere. If a sealing liquid is used in connection with the seal, water is most generally used.

In the commercial solutions known today, one has usually started from the fact that such working conditions are to be arranged for the seal constructionally that the friction heat generated between the slide surfaces is equal to the amount of heat that is removed from the seal by means of either the sealing liquid or the cooling of the product. The variable that has been controllable e.g. during the running of the pump has been the flow or pressure of the sealing liquid. Moreover, it has been known in the art to use a seal ring provided with springs, the spring force of which can be regulated by varying the rigidity of the springs, as well as a telescopic effect produced by conveying a pressurized fluid into the space between two seals having different diameters. Such a solution has been disclosed in Finnish Pat. No. 64,450. The regulating of the pressure and flow of the sealing liquid is a practicable method when there is no disadvantage in the sealing liquid getting mixed with the product. However, in the food, chemical, pharmaceutical and petrochemical industry as well as in some other branches of industry, a leakage of the sealing liquid into the product is not allowable, wherefore regulation by means of the sealing liquid is difficult in such applications. On the other hand, sealing liquid is not always available.

The seal construction disclosed in U.S. Pat. No. 4,261,581, in which construction the spring force at the seal ring is produced with a bellows member, may be mentioned as another example of solutions known in the field.

The use of the cylindrical construction of Finnish Pat. No. 64,450 is possible with any fluid, even with compressed air. Yet elastic auxiliary seals will present problems under corrosive conditions and also at high temperatures. Moreover, an absolute tightness cannot be achieved with elastomers, and therefore the maintaining of the pressure will also require a small flow.

The construction of U.S. Pat. No. 4,261,581 may also be used with any fluid. However, one problem lies in the low strength of the bellows member in connection with certain fluids. This problem is due to the fact that the bellows member is in contact with the product and the material whereof said bellows member is manufactured is very thin, the thickness being e.g. 0.2 to 0.3 mm. Thus the corrosion and mechanical wear resulting from certain products will destroy the bellows member very quickly. In any case, the spring force or the surface pressure of the slide surfaces cannot in this construction be controlled in any manner during the run.

It is an object of this invention to provide a slide ring seal eliminating the disadvantages of the earlier known solutions and affording various functions, such as spring force, moment transfer, secondary sealing and telescopic movement.

This object is met with the slide ring seal of the invention, being characterized in that the bellows member is isolated from the space for the pressure fluid by means of a sealed space and that said sealed space is connected to a pressure source via a conduit.

One advantage of the slide ring seal of the invention in comparison to the known seals is that the wear or corrosion of the bellows member presents no problems, since the bellows member is isolated from the product. Thus the use of expensive special materials due to corrosion problems is totally eliminated, and bellows members manufactured of thin materials may also be used in connection with eroding products, such as slurries and masses. Moreover, considerably higher operational pressures can be achieved with the construction of the invention than with the known solutions. The value 50 bar for the invention and the value 10 to 20 bar for the earlier known art may be stated as examples of typical maximum operational pressures. The invention also provides the advantage that the compression between the slide surfaces can be regulated in a very simple way in the desired manner e.g. during the run of the pump. With the known solutions, such an operation is not possible.

Figure 2:
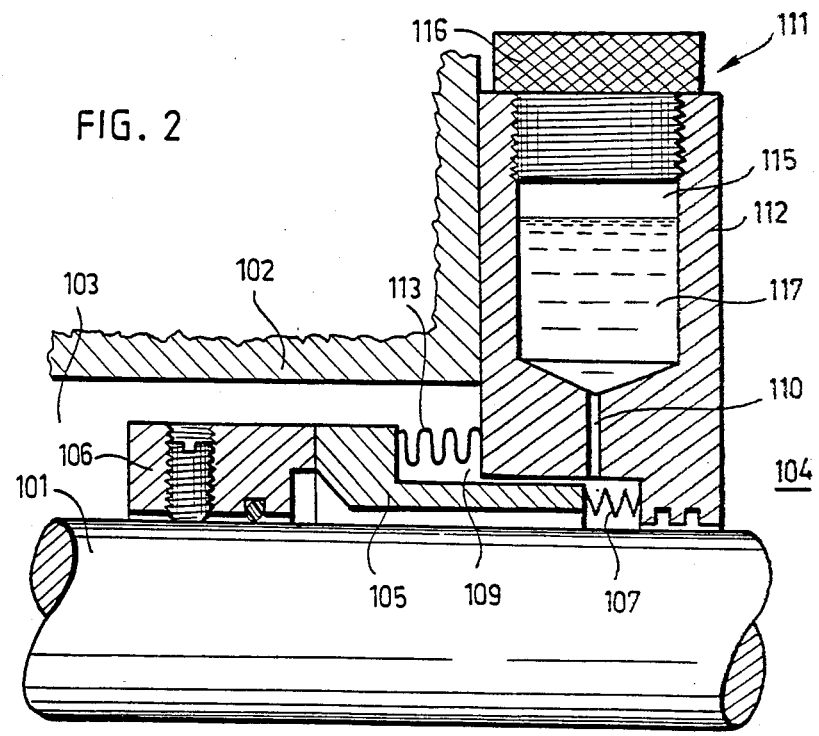

The following is a detailed description of the invention by means of preferred embodiments illustrated in the accompanying drawing, in which FIG. 1 is an axial sectional view of an embodiment of the slide ring seal of the invention, as fitted in place, and FIG. 2 is an axial sectional view of another embodiment of the slide ring seal of the invention, as fitted in place.

The embodiment of FIG. 1 shows a rotatable shaft, e.g. the shaft of a liquid pump, by the reference numeral 1 as well as a fixed wall, e.g. the body of a pump, by the reference numeral 2. There is a pressure space 3 for the pressure liquid within said body, i.e. on the left-hand side of FIG. 1, and the atmosphere 4 is outside said body.

The slide ring seal comprises a fixed seal ring 5 secured to the fixed wall 2 as well as a rotatable face ring 6 fixedly attached to said shaft 1. The seal ring 5 and face ring 6 are provided with sealing slide surfaces that are pressed against one another. The seal ring 5 is supported on said fixed wall resiliently by means of a bellows member 7, one end of said bellows member being secured to the seal ring 5 and the other to the body of the pump. The bellows member 7 is made of a metallic material by welding. The attachment of the bellows member to the body may be effected in several different ways, in the embodiment shown in the figure the end of the bellows member facing the body of the pump is attached to a fixing ring 8, which in turn is fixed to said body.

In accordance with the invention, the bellows member 7 is isolated from the space 4 for the pressure fluid by means of a sealed space 9, whereby the pressure fluid will not come into contact with the bellows member 7 possibly to damage said member. Moreover, the sealed space 9 is in communication with a regulable pressure fluid source 11 via a conduit 10. The pressure in the sealed space 9 may be regulated by means of the pressure fluid source 11, whereby, as the pressure in the space 9 is increased, the bellows member will tend to be straightened, which will result in an increase in the compression between the slide surfaces. If the pressure in the space 9 is decreased, this will result in the contraction of the bellows member, whereby the compression between the slide surfaces will be diminished.

The solution according to the invention can be realized in several different ways. In the case of FIG. 1, the construction is the following. The seal ring 5 is secured to the body of the pump with the bellows member 7 and the fixing ring 8 as well as a fixing flange 12. The sealed space 9 is thereby formed between the fixing flange 12 and the seal ring assembly 5, 7, 9 by means of packings 13, 14 disposed on each side of the bellows member 7. In this construction the conduit 10 is in communication with a chamber 17 serving as the regulable pressure source 11 and provided with an adjustable piston means 15, 16. The piston means comprises a piston member 15 and a regulating screw 16 combined therewith. A breather opening in the chamber 17 has further been indicated by the reference numeral 18 in FIG. 1; said opening may also be used as a feed opening for an external fluid, if one wishes to move the piston member 15 e.g. hydraulically or pneumatically. A further essential feature in the embodiment of FIG. 1 is that the chamber 17 provided with an adjustable piston means 15, 16 is disposed on the fixing flange 12.

FIG. 2 illustrates another embodiment of the slide ring seal according to the invention. In FIG. 2, the rotatable shaft is denoted by the reference numeral 101 and the fixed wall, e.g. the body of a pump, by the reference numeral 102. There is a pressure space 103 for the pressure liquid within said body, i.e. at the left-hand side of FIG. 2, and the atmosphere 104 is outside said body.

The slide ring seal comprises a fixed seal ring 105 secured to the fixed wall 102 by means of a bellows member 107 and a fixing flange 112. A face ring 106 rotating together with the shaft 101 is fixedly attached to said shaft, correspondingly as in the solution shown in FIG. 1. The seal ring 105 and face ring 106 are—correspondingly as in FIG. 1—fixed in place in such a manner that the slide surfaces on said rings are tightly pressed against one another. Also in this embodiment the resilience of the seal ring 105 is produced by the bellows member 107. Yet the sealed space 109 separating said bellows member from the pressure space 103 is in this embodiment formed by means of a second bellows member 113 disposed between the fixing flange 112 and the seal ring 105. Said second bellows member 113, which is in contact with the pressure fluid, may, if need be, be manufactured to be thicker than bellows member 107, and thus there will be no problems caused by corrosion or wear. The second bellows member may be made e.g. of a rubber material. In the embodiment of FIG. 2, the sealed space 109 is in communication with a regulable pressure source 111 via a conduit 110. The regulable pressure source may be e.g. a chamber 117 provided with an adjustable piston means 116. However, also this piston means may be controlled in some other way as well, e.g. hydraulically or pneumatically, as in the example of FIG. 1. Also in this embodiment, the regulable pressure source 111 is disposed on the fixing flange 112. The fluid in the chamber 117 may be either a gaseous or a liquid fluid or both. In the embodiment of FIG. 2, said fluids are shown by the reference numeral 115.

In principle, the embodiments of FIGS. 1 and 2 operate in the same manner. The compression between the slide surfaces of the seal and face ring may be controlled by regulating the pressure in space 9 or 109 by means of the pressure source 11 or 111. Then the raising of the pressure in space 9 or 109 will increase the compression between the slide surfaces, as the bellows member 7 or 107 will tend to expand. When the pressure in space 9 or 109 is diminished, the compression will decrease, as has already been stated above.

The embodiments disclosed in the foregoing are by no means intended to limit the invention, but the invention may be modified within the scope of the claims in many different ways. Thus the different parts need not be exactly similar to those shown in the figures, but also other kinds of parts may be used. The construction can also be realized as reversed, the seal ring being fastened onto the shaft and the face ring to the body. The fluid to be conveyed into space 9, 109 via the conduit 10, 110 has not been limited, and it may be a gas or liquid as required. The manual regulation of the pressure source 11, 111 used in the embodiments shown in the figures is not the only possibility, as the regulation can also be automated. In that case, the movements of the piston or other adjustable means respectively may be controlled e.g. with a temperature impulse or vibration impulse. Different control motors or valves etc. may be mentioned as examples of said other adjustable means. The regulation of the pressure in the sealed space 9, 109 may also be effected by using thermal expansion or e.g. the deformation of bimetallic pieces. As a result from said regulations, the slide ring seal will automatically respond to changes in the operating conditions, and thus especially good results will be achieved in the operation. The regulable pressure source can naturally also be disposed, instead of on the fixing flange, directly on the body, if such an arrangement is considered to be necessary.

I claim:

1. A slide ring seal for sealing the gap between a rotatable shaft (1, 101) and a fixed wall (2, 102) to separate a space (3, 103) for a pressure fluid from an external space (4, 104), said slide ring seal comprising at least one seal ring (5, 105) mounted on a fixed wall and at least one face ring (6, 106) secured to said shaft, said seal ring and face ring being provided with sealing slide surfaces that are axially pressed against one another and said seal ring (5, 105) being mounted on said fixed wall through a bellows member (7, 107), characterized in that said bellows member (7, 107) is isolated from said pressure fluid space (3, 103) by means of a sealed space (9, 109) and that said sealed space (9, 109) is connected to a pressure source (11, 111) via a conduit (10, 110).

2. A slide ring seal according to claim 1, wherein said seal ring (5) is disposed to rest on a fixing flange (12) mounted on said fixed wall (2), characterized in that said sealed space (9) is formed between said fixing flange (12) and the seal ring assembly (5, 7, 9) by means of packings (13, 14) disposed on each side of said bellows member (7) and that said conduit (10) is in communication with a chamber (17) provided with an adjustable means (15, 16).

3. A slide ring seal according to claim 1, wherein said seal ring (105) is disposed to rest on a fixing flange (112) mounted on said fixed wall (102), characterized in that said sealed space (109) is formed by means of a second bellows member (113) disposed between said fixing flange (112) and said seal ring (105) and that said conduit (110) is in communication with a chamber (117) provided with an adjustable means (116).

4. A slide ring seal according to claim 2 characterized in that said chamber (17, 117) provided with an adjustable means (15, 16, 116) is disposed on the fixing flange (12, 112).

5. A slide ring seal assembly sealing a gap between a rotatable shaft and a fixed wall and separating a pressure fluid space on one side of the fixed wall from a space on the other side of the wall, said assembly comprising:

a non-rotatable, axially slidable seal ring surrounding said shaft; a bellows member surrounding said shaft and having an end fixed to said non-rotatable seal ring and an opposite end fixed to said fixed wall; a rotatable seal ring surrounding said shaft and fixed thereto, said rotatable and non-rotatable seal rings having sealing surfaces which are slidably engaged with each other and which are axially pressed against one another; means forming a control space around said bellows and sealing said space from said pressure fluid space and from said space on said other side of said wall; and control means for selectively increasing and decreasing the axial force which presses said sealing surfaces together, said means including fluid pressure supply means, different from the fluid in said pressure fluid space, for selectively increasing and decreasing the pressure in said control space to thereby selectively extend and contract said bellows whereby said non-rotatable sealing ring is moved axially relative to said shaft.

* * * * *